United States Patent

Gold

[11] Patent Number: 5,842,731
[45] Date of Patent: *Dec. 1, 1998

[54] METHOD OF INSTALLING AN AUTO WINDSHIELD

[76] Inventor: Peter Gold, 465 N. Wood Rd., Rockville Centre, N.Y. 11570

[ * ] Notice: The term of this patent shall not extend beyond the expiration date of Pat. No. 5,549,346.

[21] Appl. No.: 815,686

[22] Filed: Mar. 12, 1997

[51] Int. Cl.⁶ ........................................ B60J 10/02
[52] U.S. Cl. .................. 296/93; 296/146.15; 52/204.591; 156/108
[58] Field of Search ................. 296/201, 93, 146.15; 52/208, 204.591; 156/108

[56] References Cited

U.S. PATENT DOCUMENTS

| 4,441,755 | 4/1984 | Endo et al. | 296/93 |
| 4,765,673 | 8/1988 | Frabotta et al. | 296/93 |
| 4,841,698 | 6/1989 | Gold | 52/208 |
| 5,009,462 | 4/1991 | Katcherian | 296/201 |
| 5,163,731 | 11/1992 | Gold | 296/201 |
| 5,480,504 | 1/1996 | Gold | 296/93 X |
| 5,549,346 | 8/1996 | Gold | 296/93 |
| 5,669,131 | 9/1997 | Gold | 296/93 X |
| 5,688,016 | 11/1997 | Gold | 296/93 |

*Primary Examiner*—Joseph D. Pape
*Attorney, Agent, or Firm*—Myron Amer PC

[57] ABSTRACT

An auto windshield molding having a crown in covering relation over a gap between the windshield peripheral edge and the auto panel bounding the windshield opening which has an adhesive attachment established for the crown upon the auto panel to support the weight of an assembly of the windshield and molding attached to the windshield peripheral edge until the viscous urethane hardens to permanently bond the windshield in place, to obviate the need of a windshield-supporting dam and other benefits.

1 Claim, 1 Drawing Sheet

METHOD OF INSTALLING AN AUTO WINDSHIELD

The present invention relates generally to improvements in replacing broken windshields with a substitute windshield using urethane to bond the replacement windshield in place, wherein the improvements facilitate the installation using the rubber molding which is attached about the peripheral edge of the windshield to serve not only as a weather seal but also as a support for the windshield while the urethane is curing from a viscous into a hardened state necessary to achieve its bonding function.

EXAMPLE OF THE PRIOR ART

When an original equipment manufacture (OEM) windshield, i.e. the windshield provided in the purchased auto, is broken it is replaced by an auto windshield repair shop performing what is commonly referred to as an "aftermarket" service, and the replacement installation typically uses urethane for its bonding function and, in addition of course to the windshield, a rubber molding which is affixed about the peripheral edge of the windshield to serve as a weather seal and having other benefits. It is desirable to affix the molding to the windshield prior to immediate use, since the rubber molding in its attached relation to the windshield minimizes chipping of the windshield peripheral edge and in other ways facilitates the handling of the windshield in the aftermarket shop, particularly when the windshield and molding preassembly is maintained in inventory awaiting a customer with a broken windshield problem.

The replacement windshield procedure as above generally outlined is disclosed in U.S. Pat. No. 4,165,119 issued to Carl E. Hedeen et al. for Window Reveal Molding on Aug. 21, 1979 which, although related to an OEM windshield installation, is applicable to an aftermarket windshield installation since in the aftermarket it is required to duplicate the conditions of an OEM windshield installation. In the described installation, use is made of the bonding function of a curable adhesive material, which adhesive material of choice is urethane, and the windshield is supported from below on a so-called rubber dam until the curing is completed. While generally satisfactory, carryover from an OEM windshield installation, as for example in the use of a dam, to the aftermarket windshield installation is an unnecessary shortcoming, as are other installation techniques currently being used.

Broadly, it is an object of the present invention to provide a greatly facilitated aftermarket windshield installation overcoming the foregoing and other shortcomings of the prior art.

More particularly, it is an object to achieve preassembly of the windshield and the molding not only for the facilitated handling thereof in inventory and until actual use, but also to significantly contribute to simplifying and otherwise improving the installation of the windshield, all as will be better understood as the description proceeds.

The description of the invention which follows, together with the accompanying drawings, should not be construed as limiting the invention to the example shown and described, because those skilled in the art to which this invention appertains will be able to devise other forms thereof within the ambit of the appended claims.

Figure 1:
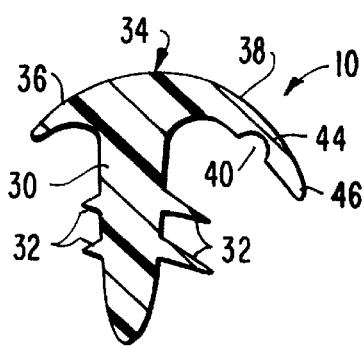
FIG. 1 is a side elevational view, in cross section, of a known auto windshield molding.
Figure 2:
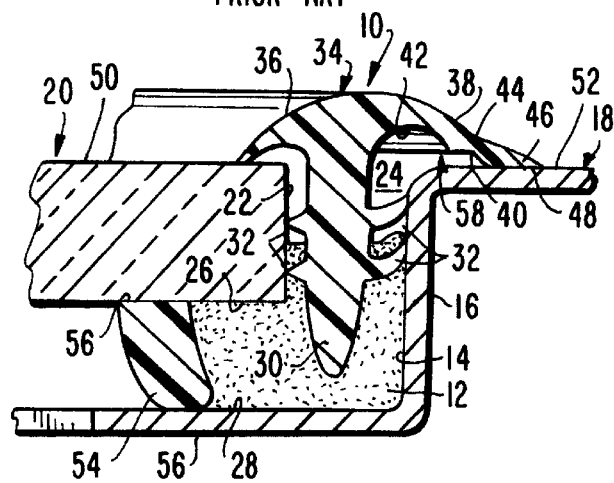
FIG. 2 is a view similar to FIG. 1 illustrating the molding of FIG. 1 in use in the installation of an auto windshield.

FIGS. 1 and 2 illustrate a rubber extrusion already known from U.S. Pat. No. 5,549,346 issued on Aug. 27, 1996 to Peter Gold for Auto Windshield Molding with Improved Crown of an auto windshield molding, generally designated 10, of a type used in establishing bonding using hardened urethane 12 to hold in place in a slightly oversized opening 14 bounded by a vertical flange 16 of an auto panel 18 a slightly undersized auto windshield 20 delimited by a peripheral edge 22, wherein the noted size differences result in a gap 24 into which, in the installation of the windshield 20, the molding 10 is inserted in the gap 24 into a previously deposited viscous mass of urethane 12 which cures into a hardened condition to bond or hold the windshield 20 in place particularly in the extent of the urethane extending from the windshield surface location 26 to the flange surface location 28, it being understood that urethane is chemically inert to the rubber construction material of the extruded molding 10. To supplement the bonding function of the urethane 12, the molding 10 includes a vertical leg 30 having transverse barbs 32 which become immersed in the viscous urethane 12 during insertion of the molding 10 into the gap 24 and have urethane hardened in engaged relation about the barbs 32.

Molding 10 also serves as a closure for the gap 24 and as a weather seal for the windshield opening 14, and to these end uses includes a horizontally oriented crown, generally designated 34, which provides an inboard extending crown length portion 36 over the windshield peripheral edge 22 and an outboard extending crown length portion 38 over the body panel 18. In the patented molding embodiment of U.S. Pat. No. 5,549,346 an inverted U-shaped notch 40 is extruded in the undersurface 42 of the outboard crown length portion 38 and serves as a hinge allowing a degree of movement, as at the location 44, in the end 46 of the length portion 38 so that the corresponding undersurface of the end 46 makes flush contact against the supporting surface area 48 of the auto panel 18, said degree of movement being helpful in making adjustments for height differences between the exterior surface 50 of the windshield 20 and the surface 52 of the auto panel 18.

In the installed condition of the FIG. 1 molding, and as illustrated in FIG. 2, a so-called dam 54 is adhesively secured, as at 56, about the windshield peripheral edge 22 to support the weight of the windshield 20 on the horizontal flange 56 until the viscous urethane 12 hardens. In accordance with the within inventive installation method the dam 54 and barbs 32 are rendered unnecessary and the construction of the molding used is modified from that of FIG. 1 to that of FIG. 3 and, most important, the hinge 58 is advantageously used, as will be better understood as the description proceeds, to facilitate the installation of the windshield 20 in the auto windshield opening 14.

Figure 3:
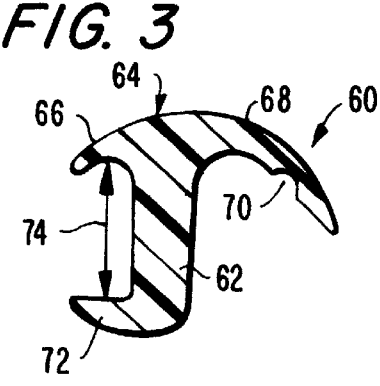
FIG. 3 is a view from the same perspective as FIG. 1, but illustrating an auto windshield molding according to the present invention.
Figure 4:
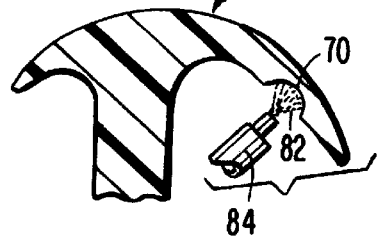
FIGS. 4 and 5 are partial views of the molding of FIG. 3 illustrating the preparation of the molding for use in the within inventive method of installing an auto windshield.
Figure 6:
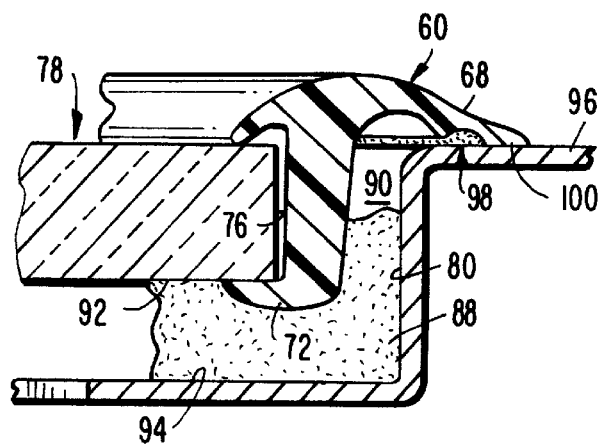
FIG. 6 is a view similar to FIG. 2, but illustrating the molding of FIGS. 3–5 in use in the installation of an auto windshield.
Figure 5:
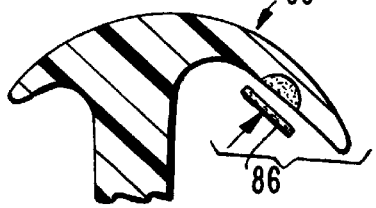

As shown in FIG. 3, the within inventive extruded molding, generally designated 60, similarly has a first vertical leg 62 and, adjacent an upper end, a horizontally oriented crown 64 with an inboard extending length portion 66, an outboard extending length portion 68 with the inverted U-shaped notch 70, and is completed with a second horizontally oriented leg 72 adjacent the bottom of the leg 62 which second leg 72 cooperates with inboard crown length portion 66 to bound a peripheral edge-engaging compartment 74 adapted to grippingly engage the auto windshield peripheral edge 76 inserted into the compartment 74.

In the preparation of the molding 60 for its use in installing the windshield 78 in the auto windshield opening 80, a commercially available hot melt adhesive 82 is deposited in the notch 70 using a caulking gun or the like 84. To prevent premature adhesive functioning of the adhesive 82, it is covered by a release strip 86 which is chemically constituted to peel off the adhesive 82 and expose it for use.

The installation of, or preparation for installation of, the auto windshield 70 contemplates the step of inserting the windshield peripheral edge 76 into the molding compartment 74. The windshield with attached molding 78, 60 optionally is placed in inventory awaiting use for a broken windshield which has to be removed and replaced, or installed in an available open auto windshield opening 80. If the latter, the user then removes the release strip 86 exposing the adhesive 82 and exercises a second option, namely to then deposit viscous urethane 88 in the gap 90 or to delay this deposit as the last step in the installation procedure. Assuming the viscous urethane 88 is deposited in the gap 90, the windshield and molding 78, 60 is lowered into the auto windshield opening 80 and causes the second leg 72 and adjacent surface inboard of the leg 72 to make contact with the urethane 88, as at the location 92, opposite the urethane contact at the flange location 94. The urethane 88 being at this time uncured is not functional to support the weight of the windshield 78 and is the circumstance requiring use of the prior art weight-supporting dam 54 which has been omitted, but this condition of the urethane is without serious adverse consequence. Instead, the crown outboard extending length portion 68 is pressed into contact with the auto body panel 96 establishing, as at 98, an adhesive attachment between the exposed adhesive 82 and the underlying surface 100 of the auto body panel 96. In effect, therefore, the windshield 78 is supported in the windshield opening 80 by the crown outboard extending length portion 68 attached to the auto panel 96 until the urethane 88 cures into a hardened condition completing the bonding in place of windshield 78 in the windshield opening 80.

If the option is exercised to deposit the viscous urethane 88 into the gap 90 after the windshield is supported in what can aptly be characterized as a "floating" condition in the windshield opening 80 by the adhesively attached crown outboard length portion 68, access to the gap 90 for the deposit is from the interior of the auto in the opening bounded by the opposite locations 92 and 94.

For completeness' sake it is noted that in practice a hot melt adhesive providing satisfactory results is that sold under the designation 2382 by H. B. Fuller Company of Grand Rapids, Mich. 49504.

While the molding for practicing the within inventive method, as well as said method herein shown and disclosed in detail, is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A method of urethane-bonding an auto windshield in an auto windshield opening in respective undersized and oversized relation to each other, said slightly oversized auto windshield opening bounded by an auto panel, said slightly undersized auto windshield delimited by a peripheral edge using in a gap resulting from said size differences an extruded rubber molding of a type having a first vertically oriented leg with a horizontally oriented crown adjacent an upper end of said first leg providing an inboard extending crown length portion over said windshield peripheral edge, an outboard extending crown length portion over said body panel and a second horizontally oriented leg adjacent a lower end of said first leg extending inboard beneath said windshield peripheral edge, said urethane bonding method comprising a first step of embodying said extruded molding with a downwardly inverted U-shaped notch in said outboard extending crown length portion at a location inwardly of a peripheral edge thereof, a second step of depositing adhesive in said U-shaped notch, a third step of engaging said windshield peripheral edge between said inboard extending crown length portion and said second horizontally oriented leg, a fourth step of depositing viscous urethane in said gap, a fifth step of urging in descending movement said windshield-attached molding into said gap, and a sixth step of establishing an adhesive attachment between said outboard extending crown length portion and said body panel at said adhesive deposit, whereby said adhesively attached outboard extending crown length portion supports said windshield during the curing of said viscous urethane into a hardened condition bonding said windshield in place in said auto windshield opening.

\* \* \* \* \*